United States Patent Office 3,187,477
Patented June 8, 1965

3,187,477
METHOD OF MAKING A SPECIAL PACKAGE
Robert L. Dreyfus, Arlington, Mass., assignor to W. R. Grace & Co., Cambridge, Mass., a corporation of Connecticut
Filed May 31, 1960, Ser. No. 32,928
5 Claims. (Cl. 53—30)

The present invention relates to a novel method of packaging articles and, more specifically, to an improved method utilizing a heat shrinkable, thermoplastic, oriented film to provide a protective covering for articles. The invention also relates to a novel package resulting from utilization of the improved method.

The use of thin plastic films for providing protective coverings and/or packaging of articles has become quite popular in recent years. However, the methods and materials heretofore used have not been entirely satisfactory for commercial use. The prior practice has been generally to wrap articles in a plastic material which stretches when wet and shrinks when it dries or to dip the articles into a plastic in liquid form to provide a tight covering or package. These prior methods have proved expensive and impractical in many instances in that the resulting covering was not strong enough or tight enough. Some efforts have been made to use plastic materials having heat shrinkable properties, but these materials normally became tacky when heated as they did not have sufficient shrinkability below their plasticizing temperature to provide a tight package or covering. In addition, such heat shrinkable material had a tendency to lose its tear strength when heated and then cooled and, thus did not provide a sufficiently strong tough, tight package.

An object of the present invention is to provide a method of packaging a group of articles in a covering made from oriented, heat shrinkable, thermoplastic film.

It is a further object of the present invention to provide a method of packaging a group of articles in a continuous strip or tube in which each article is spaced apart from other articles within the package.

Another object of the present invention is to provide an inexpensive commercial package wrapped in a transparent, tough film.

Still a further object of the present invention is to provide a package for a plurality of articles which package is in the form of a strip or tube and in which the articles are spaced apart and prevented from coming in contact with other articles in the strip.

Figure 1:
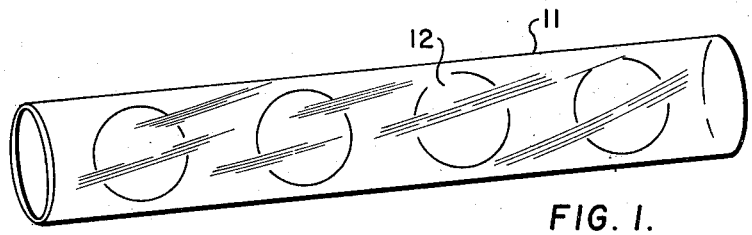

These and other objects of the present invention will appear more fully in the following specification and claims taken in conjunction with the accompanying drawings in which:

FIGURE 1 is a perspective view showing a plurality of articles within a loosely applied tube or envelope of heat shrinkable, oriented, thermoplastic film.

Figure 2:
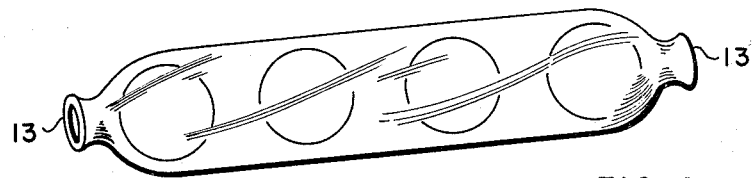

FIGURE 2 discloses a perspective view of a further step in the method of providing the finished covering for the plurality of articles.

Figure 3:
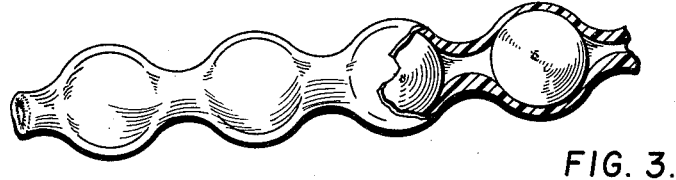

FIGURE 3 illustrates the finished package resulting from the method of the present invention.

The preferred heat shrinkable polymer is an irradiated, biaxially oriented polyethylene film having a shrink energy of at least 150 p.s.i. in both directions at 96° C. The polyethylene was prepared by irradiating Alathon 14 (a high pressure, branch chained polyethylene, molecular weight about 20,000 density 0.916) to a dosage of 12 megarad. The film was biaxially oriented by being stretched 350% in both directions.

In general there is employed in the invention polyethylene film or tubing which has been irradiated to an extent of 2 to 100 megarad, preferably 6 to 20 megarad. The irradiation can be accomplished in conventional fashion, e.g. by the use of a high voltage resonant transformer, such as the 2,000,000 volt General Electric resonant transformer, or high energy particle generators of 50,000 to 50,000,000 volts or a Van de Graaf electron generator.

In addition to the use of electrons for irradiating the polyethylene, there can be employed any of the irradiation procedures disclosed in Baird et al. application Serial No. 713,484 filed February 7, 1958 (now U.S. Patent 3,022,543), or Ranier et al. Patent 2,877,500. The disclosures of the Baird et al. application and Rainer et al. patent are hereby incorporated by reference.

If the film is biaxially oriented it can normally be carried out to an extent of 100 to 700% longitudinally and 100 to 900% laterally. The biaxial stretching can be carried out by trapping a bubble of air within heated, irradiated polyethylene tubing as disclosed in the Baird et al. application. The biaxially oriented polyethylene prepared by such a procedure has a high shrink energy, e.g. 100 to 500 p.s.i. at 96° C. It will be obvious to one skilled in the art that if it is desired to monoaxially orient the film, it can be done either laterally or longitudinally of the film.

There can be employed as a starting polyethylene for the irradiation procedure high, low, or medium density polyethylene prepared by low or high pressure technique. The starting polyethylene can have a molecular weight of 7,000 or 12,000 or 14,000 or 21,000 or 35,000 or even higher.

In place of the irradiated polyethylene, there can be employed irradiated or non-irradiated polypropylene. The polyethylene or polypropylene films must in either case be monoaxially or biaxially oriented.

Other films may be employed in the practice of the instant invention, e.g. polyvinyl chloride.

FIGURE 1 discloses an envelope or tubing made of irradiated, high shrink energy, biaxially oriented polyethylene 11 which is open at both ends. A plurality of articles 12, such as apples, are placed in the tube in linear fashion. An excess of film extends beyond the enclosed articles at both ends of the tube which is sufficiently long so that the articles may be spaced a distance of from 1 to 2 inches from each other within the tube. Heat is applied to both ends of the tube causing a reduction of the diameter of the ends 13 of the tube thereby entrapping the articles within said tube. The articles within the tube are then spaced apart and heat applied to that portion of the tube between the articles causing a reduction or constriction of the tube diameter between said articles thereby serving to encase the articles. The ends of the tube may be left open so that air can freely circulate within the tube.

The shrinking of the oriented film is accomplished by the application of heat to the oriented film. Hot air from a hot air blower is the preferred source of heat, but it is also possible to use heated metal surfaces to shrink the tubing.

This invention also encompasses the use of a flat sheet of film in place of the tube of film disclosed in the preceding example. The film is folded in the form of a tube with articles to be packaged spaced within. In shrinking the ends of the thus-formed roll or tube of film and the film between the spaced articles, it will be observed that the overlapping sides of the film will be held together by the binding effect of the shrunk portions of the film alone. It is not necessary to otherwise fasten or seal the overlapping edges of film to form a tube.

The package produced by the present invention is particularly suitable for wrapping articles which are inspected and handled by purchasers and which are easily bruised by handling. This package makes it possible to retail products vertically by hanging from a suitable support thereby taking up less floor space or the package may be wound about a reel so that the product could be dispensed from a roll. Any desired number of articles may be separated from the package merely by cutting between the articles in the region of reduced film diameter.

Fruits and vegetables may be advantageously packaged by this method. Apples and tomatoes are especially suitable since they are thin skinned and susceptible to bruising. It is obvious that articles other than food items may be similarly packaged.

The invention described in detail in the foregoing specification is susceptible to changes and modifications, both as to method and resulting articles without departing from the principle and spirit thereof. For this reason, the terminology used in the specification is for the purpose of description and not of limitation, the scope of the invention being defined in the claims.

Having described my invention what I claim as new and desire to secure by Letters Patent is:

1. A method of packaging articles which comprises placing the articles within a tubing of heat shrinkable film selectively and sequentially, heat shrinking the film at the end of the tubing to reduce the diameter of the end of the tubing thereby enclosing the articles within the tubing, the enclosed articles being spaced within the tubing and then heat shrinking the tubing between each article to effect a permanent separation of the articles.

2. A method according to claim 1 wherein said heat shrinkable film is an oriented film made of a solid polymer of an olefin having 2 to 3 carbon atoms.

3. A method as defined in claim 1 wherein the heat shrinkable film is an irradiated, high shrink energy, biaxially oriented polyethylene.

4. A method of packaging which comprises placing a plurality of articles within a tube of heat-shrinkable thermoplastic film, locating the articles linearly within said tube so that a space exists between each article, selectively applying heat to those portions of the tube overlying the space between each of said articles to shrink the film causing a reduction in tube diameter thereby effecting a permanent separation of the articles and, thereafter applying heat to the film at each end of the tube to shrink the film and reduce the size of the openings thereby locking the articles within the tube.

5. A method according to claim 4 wherein said tube of heat-shrinkable thermoplastic film is formed from a sheet of film, the longitudinal edges of which are overlapped forming a tube.

References Cited by the Examiner
UNITED STATES PATENTS

| | | | |
|---|---|---|---|
| 1,937,468 | 11/33 | Talbot | 53—30 X |
| 2,508,197 | 5/50 | Singer | 53—29 X |
| 2,575,138 | 11/51 | Slaughter. | |
| 2,668,403 | 2/54 | Rumsey | 53—30 |
| 2,711,346 | 6/55 | Irwin et al. | 53—30 X |
| 2,737,000 | 3/56 | McCargar. | |
| 2,852,134 | 9/58 | Werner. | |
| 2,878,628 | 3/59 | Curry | 53—30 |
| 2,890,552 | 6/59 | Henderson | 53—30 |
| 2,908,383 | 10/59 | Vogt | 206—65 |
| 2,956,672 | 10/60 | Kirkpatrick | 206—46 |
| 2,980,245 | 4/61 | Stoker. | |

FRANK E. BAILEY, *Primary Examiner.*

EARLE DRUMMOND, ROBERT A. LEIGHEY, ROBERT E. PULFREY, *Examiners.*